United States Patent
Deutscher et al.

(10) Patent No.: US 12,098,085 B2
(45) Date of Patent: Sep. 24, 2024

(54) AGENTS FOR USE IN HYDROMETALLURGICAL PROCESS STREAMS

(71) Applicant: INDORAMA VENTURES OXIDES AUSTRALIA PTY LIMITED, Brooklyn (AU)

(72) Inventors: Ken Deutscher, Sunbury (AU); Sasha Boskovic, Watsonia (AU); Andrew Coveney, Ferntree Gully (AU); Jason Hong, Kew (AU); Salvatore Lazzaro, Taylors Lakes (AU); Kate Tildesley, Coburg (AU)

(73) Assignee: Indorama Ventures Oxides Australia Pty Limited, Brooklyn (AU)

( * ) Notice: Subject to any disclaimer, the term of this patent is extended or adjusted under 35 U.S.C. 154(b) by 378 days.

(21) Appl. No.: 17/630,889

(22) PCT Filed: Aug. 27, 2020

(86) PCT No.: PCT/AU2020/000092
§ 371 (c)(1),
(2) Date: Jan. 27, 2022

(87) PCT Pub. No.: WO2021/035282
PCT Pub. Date: Mar. 4, 2021

(65) Prior Publication Data
US 2022/0259082 A1    Aug. 18, 2022

(30) Foreign Application Priority Data

Aug. 28, 2019 (AU) .................... 2019903141

(51) Int. Cl.
*C02F 1/60* (2023.01)
*C02F 1/56* (2023.01)
(Continued)

(52) U.S. Cl.
CPC .............. *C02F 1/60* (2013.01); *C02F 1/56* (2013.01); *C08L 71/02* (2013.01); *C22B 3/20* (2013.01); *C22B 3/44* (2013.01)

(58) Field of Classification Search
None
See application file for complete search history.

(56) References Cited

U.S. PATENT DOCUMENTS 2,831,034 A * 4/1958 Pruitt .................. A01N 25/30
568/624
3,710,939 A   1/1973 Hostynek et al.
(Continued)

FOREIGN PATENT DOCUMENTS

AU    640296 A     6/1992
CN    108863287 A  11/2018
(Continued)

OTHER PUBLICATIONS

International Search Report issued by the Australian Patent Office on Oct. 30, 2020 in connection with International Application No. PCT/AU2020/000092, 5 pages.
(Continued)

*Primary Examiner* — Krishnan S Menon
(74) *Attorney, Agent, or Firm* — Edward Korompai

(57) ABSTRACT

The present disclosure relates to the field of chemical compounds, compositions and processes. More specifically, the present disclosure relates to compositions having a high-loading capacity in an aqueous medium and to compositions, processes and uses thereof as silica coagulants in hydrometallurgical process streams.

16 Claims, 3 Drawing Sheets

(51) Int. Cl.
    *C08L 71/02*   (2006.01)
    *C22B 3/20*    (2006.01)
    *C22B 3/44*    (2006.01)

(56) References Cited

U.S. PATENT DOCUMENTS

| | | | |
|---|---|---|---|
| 4,487,854 A | 12/1984 | Hartman | |
| 4,550,194 A | 10/1985 | Reichel et al. | |
| 2012/0229559 A1* | 9/2012 | Matsushita | C09D 11/40 |
| | | | 106/31.86 |
| 2019/0292614 A1* | 9/2019 | Kondo | C08L 71/02 |

FOREIGN PATENT DOCUMENTS

| | | |
|---|---|---|
| GB | 777978 A | 7/1957 |
| JP | H0622644 B2 | 3/1994 |
| JP | 2010052355 A * | 3/2010 |
| WO | 2004/016828 A2 | 2/2004 |
| WO | 2009/044298 A2 | 4/2009 |
| WO | 2012/027113 A1 | 3/2012 |
| WO | 2015/168376 A1 | 11/2015 |
| WO | 2017/003749 A1 | 1/2017 |
| WO | 2017/099941 A1 | 6/2017 |

OTHER PUBLICATIONS

Written Opinion of the International Searching Authority issued by the Australian Patent Office on Oct. 30, 2020 in connection with International Application No. PCT/AU2020/000092, 5 pages.

Kim, G. et al., "Application of Depletion Attraction in Mineral Flotation: II. Effects of Depletant Concentration", Minerals, 2018, vol. 8, pp. 450-460.

* cited by examiner

AGENTS FOR USE IN HYDROMETALLURGICAL PROCESS STREAMS

FIELD OF THE INVENTION

The present disclosure relates to the field of chemical compounds, compositions and processes. More specifically, the present disclosure relates to compositions having a high-loading capacity in an aqueous medium and to compositions, processes and uses thereof as silica coagulants in hydrometallurgical process streams.

BACKGROUND TO THE INVENTION

The presence of silica in hydrometallurgical process streams is a significant problem in the hydrometallurgical processing industry. Natural silica, as found in ores and mineral concentrates, has a low aqueous solubility. However, when these ores or mineral concentrates are digested in strong acids or alkalis at elevated or ambient temperatures, large amounts of silicic acid or other soluble silica species are released. The silicic acid or other soluble silica species formed can then polymerise in solution to form colloidal silica. If these contaminants are not removed, they can later cause difficulties in hydrometallurgical processes. For example, large quantities of silica, which are extracted in acid leaching of ores, form colloidal particles which, although not visible, may cause problems downstream by forming deposits on equipment, and posing difficulties in solid-liquid separations, such as thickening, clarifying and filtration. They can also interfere with solvent extraction processes by forming "Pickering emulsions", stable CRUD and lengthening phase disengagement times. Colloidal silica is also known to interfere with Ion Exchange processes. Such particles are generally less than 0.5 microns in diameter.

Current methods to remove silica can include the use of flocculants, however flocculants alone can be ineffective on colloidal silica removal. Filters can also be used. However, given the fine particle size of the silica particles, these could pass through filters. Although membrane filters of appropriate fineness may be used, use of such filters has the disadvantage of significantly increasing processing times and expense.

Linear polyethylene glycol (PEG) molecules can be used for coagulation and agglomeration of colloidal silica particles in hydrometallurgical process streams and may negate the deleterious effect of colloidal silica on solvent extraction processes.

High molecular weight linear PEG molecules, having a molecular weight of about 1 million, have been used with some success in removing silica by coagulation. However, such high molecular weight polyethylene glycols are not readily available and are expensive.

Lower molecular weight linear polyethylene glycols with a molecular weight of about 7,000 to 102,000 have also been used in removing silica by coagulation. Such polyethylene glycols are commercially available and are more affordable than the high molecular weight linear polyethylene glycols mentioned above. Lower molecular weight linear polyethylene glycols for use in coagulation of silica particles in aqueous mineral process streams are conveniently stored and/or transported at up to 50% to 52% w/w in water.

There is a need for alternative compounds, compositions and methods for coagulating silica particles in hydrometallurgical process streams.

SUMMARY OF THE INVENTION

In an embodiment, a silica agglomeration composition is disclosed having a silica coagulant and water. The silica coagulant is dissolved in the water at a weight ratio of silica coagulant to water of about 54% or higher.

According to some embodiments of the present disclosure, the silica coagulant is a reaction product of glycerine and alkylene oxide.

According to some embodiments of the present disclosure, the silica coagulant is of formula (I):

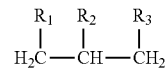

In formula (I), each of $R_1$, $R_2$ and $R_3$ is independently —O(AO)$_n$H. Each AO group is, independently, an alkyleneoxy group that includes ethyleneoxy ("EO"), propyleneoxy ("PO"), butyleneoxy ("BO"), and combinations thereof. Each n is independently 52 to 150. The silica coagulant has a molecular weight of above 7,000. In some embodiments, the silica coagulant has a molecular weight of about 7,000 to 20,000.

According to some embodiments of the present disclosure, each (AO)$_n$ of formula (I) may be a block EO/PO mixture, a block EO/BO mixture, a block PO/BO mixture, a block EO/PO/BO mixture, a random EO/PO mixture, a random EO/BO mixture, a random PO/BO mixture, a random EO/PO/BO mixture, and combinations thereof.

According to some embodiments of the present disclosure, each of $R_1$, $R_2$ and $R_3$ of formula (I) is independently —O(AO)$_n$(EO)$_p$H, having each p independently being 1 to 150 and n+p being 52 to 150. In an embodiment of the present disclosure, the (AO)$_n$ of —O(AO)$_n$(EO)$_p$H is a random EO/PO mixture with a ratio of EO:PO of 3:1.

According to some embodiments of the present disclosure, each n of formula (I) is independently 60 to 80.

According to some embodiments of the present disclosure, the silica coagulant has a molecular weight from about 8,000 to about 12,000.

According to some embodiments of the present disclosure, the silica coagulant has a molecular weight from about 8,000 to about 11,000.

According to some embodiments of the present disclosure, the silica coagulant is dissolved in the water at a weight ratio of silica coagulant to water of about 57% or higher. In some embodiments, the silica coagulant is dissolved in the water at a weight ratio of silica coagulant to water of about 57% to about 70%.

According to some embodiments of the present disclosure, the silica coagulant is dissolved in the water at a weight ratio of silica coagulant to water of about 60% or higher. In some embodiments, the silica coagulant is dissolved in the water at a weight ratio of silica coagulant to water of about 60% to about 70%.

According to some embodiments of the present disclosure, the silica coagulant is dissolved in the water at a weight ratio of silica coagulant to water at a range of from about 54% to about 70%.

In an embodiment, a method for agglomerating silica particles in an aqueous mineral process stream is disclosed that includes the steps of providing a silica coagulant of formula (I) and contacting the silica coagulant and the silica particles in the aqueous mineral process stream to form agglomerated silica particles.

In an embodiment, a method for agglomerating silica particles in an aqueous mineral process stream is disclosed that includes the steps of (i) providing a silica agglomerating composition comprising (a) a silica coagulant of formula (I) and (b) water, and (ii) contacting the silica agglomerating composition and the silica particles in the aqueous mineral process stream to form agglomerated silica particles.

According to some embodiments of the present disclosure, the method additionally contacts at least one flocculant agent to the agglomerated silica particles. The flocculant agent may be a particulate material, a polymeric flocculant, and combinations thereof.

According to some embodiments of the present disclosure, the method removes the agglomerated silica particles from the aqueous mineral process stream. This removal may be done by filtering, settling, flocculating, and combinations thereof.

BRIEF DESCRIPTION OF THE FIGURES

In order that the present disclosure may be readily understood and put into practical effect, reference will now be made to the accompanying figures.

DETAILED DESCRIPTION OF THE INVENTION

Figure 1:
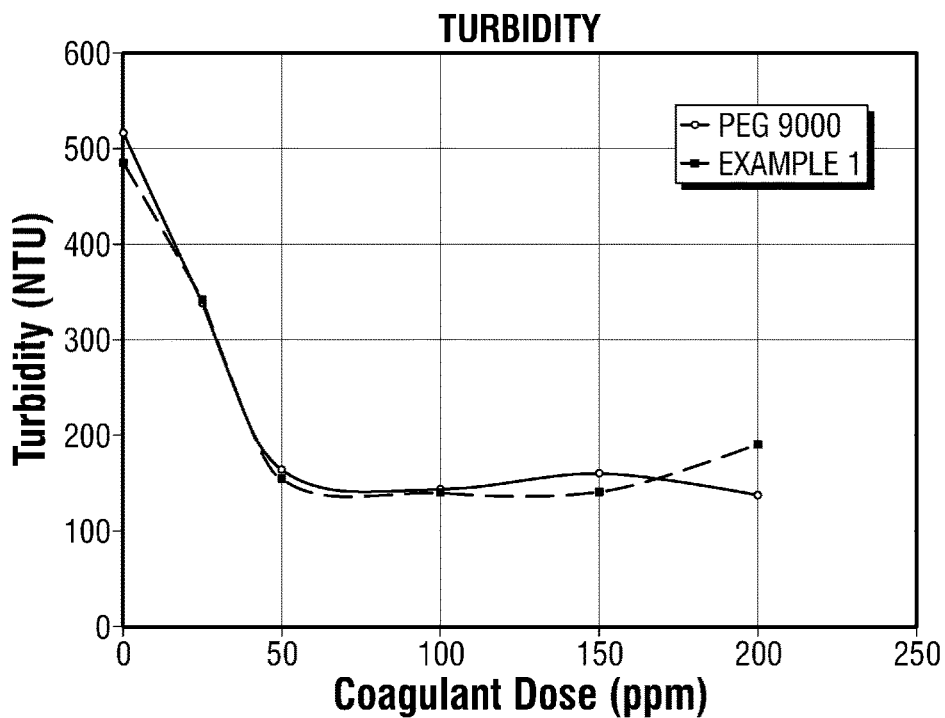
FIG. 1 compares turbidity by dosage between a silica coagulant according to an embodiment of the present disclosure ("Example 1") and a known linear PEG of equivalent weight ("PEG 9000").

The following description refers to specific embodiments of the present disclosure and is in no way intended to limit the scope thereof to those specific embodiments. Accordingly, the materials, methods, and examples are illustrative only and are not intended to be limiting.

Reference in the specification to "an embodiment", "one embodiment", "another embodiment", "particular embodiments", or "certain embodiments" means that a particular feature, structure, characteristic, or function described in connection with the embodiment is comprised in at least one embodiment of the disclosure and may be in more than one embodiment. The appearances of the phrases "in one embodiment", "in some embodiments", or "in certain embodiments", etc., in various places throughout the specification are not necessarily all referring to the same embodiment or embodiments.

As used herein, the terms "comprises", "comprising", "includes", "including", "has", "having", or any other variation thereof, are intended to cover a non-exclusive inclusion. For example, a compound, composition, process, method, article, or apparatus that comprises a list of elements is not necessarily limited to only those elements but may include other elements not expressly listed or inherent to such compound, composition, process, method, article, or apparatus.

As used herein, the expression "consisting essentially of" is intended to cover a non-exclusive inclusion and permits the inclusion of substances that do not materially affect the basic and novel characteristics of the compound or composition under consideration. The term "consisting essentially of" occupies a middle ground between "comprising" and "consisting of".

As used herein, the expression "consisting of" is intended to cover an exclusive inclusion and does not permit the inclusion of substances that materially affect the basic and novel characteristics of the compound or composition under consideration. If the expression appears, it is not intended to exclude impurities (including by-products) that may be associated with the compound or composition.

Further, any prior art reference or statement provided in the specification is not to be taken as an admission that such art constitutes, or is to be understood as constituting, part of the common general knowledge.

As used herein, the term "a" or "an" is employed to describe elements and components described herein. This is done merely for convenience and to give a general sense of the scope of the disclosure. This description should be read to include one or at least one and the singular also includes the plural, unless it is obvious that it is meant otherwise.

As used herein, the terms "soluble" and "dissolved" are employed to describe a homogenous mixture when the components of the composition are mixed together. Generally, a component is considered to be soluble or dissolved in another component, when no appreciable precipitation, crystallisation and/or phase separation is visible to the naked eye.

As used herein, the terms "equivalent PEG weight" and "PEG equivalent weight" are used interchangeably, and are employed to describe the number of equivalent ethylene oxide units in a polyethylene glycol molecule, or the weight in grams of ethylene oxide in one mole equivalent of polyethylene glycol (g/mol).

Unless otherwise defined, all technical and scientific terms used herein have the same meaning as commonly understood by one skilled in the art. Although methods and materials similar or equivalent to those described herein can be used in the practice or testing of embodiments of the present disclosure, suitable methods and materials are described below.

In this disclosure, "molecular weight" or "Mw" is measured by a hydroxyl value (OHV) by acetylation. The Mw of silica coagulant is obtained from the equation:

$$Mw = (56100 \times 2)/OHV$$

where OHV is the number of milligrams of potassium hydroxide (KOH) required to neutralise the acetic acid (AcOH) from the acetylation of one gram of silica coagulant. The acetylation of the free hydroxyl groups in the silica coagulant occurs with acetic anhydride in pyridine, and the amount of KOH is measured by titration after quenching the reaction with water.

The OHV can be calculated from the equation:

$$OHV = [[(56.1)(N)(V_B - V_{acct})]/W_{acct}] + AV$$

where $V_B$ is the amount (ml) KOH solution required for the titration of a blank, $V_{acct}$ is the amount (ml) of KOH solution required for the titration of the acetylated silica coagulant, $W_{acet}$ is the weight of silica coagulant (in grams) used for acetylation, N is the normality of the titrant, AV is the acid value of the silica coagulant.

It would be understood by the skilled person that the molecular weight calculation can have a margin of error of about +/−3%.

Except in the Examples, or where otherwise explicitly indicated, all numerical quantities in this description specifying amounts of materials, reaction conditions, molecular weights, number of carbon atoms and the like, are to be understood as modified by the word "about". Except where otherwise indicated, all numerical quantities in the description specifying amounts or ratios of materials are on a per weight basis. It is to be understood that the upper and lower amount, range, and ratio limits set forth herein may be independently combined. Similarly, the ranges and amounts for each element of the disclosure can be used together with ranges or amounts for any of the other elements.

Embodiments of the present disclosure describe a silica agglomeration composition comprising a silica coagulant and water.

In an embodiment, the silica coagulant comprises a reaction product of glycerine and alkylene oxide.

In an embodiment, the silica coagulant is described by formula (I):

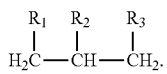

In formula (I), each of $R_1$, $R_2$ and $R_3$ is independently —O(AO)$_n$H. As used herein, each AO group may be, independently, an alkyleneoxy group selected from ethyleneoxy ("EO"), propyleneoxy ("PO"), butyleneoxy ("BO"), and combinations thereof. In embodiments of the present disclosure, the AO group may also be described as formula II.

    formula II

In embodiments of the present disclosure, the AO group may also be described as in formulas IIIa and IIIb:

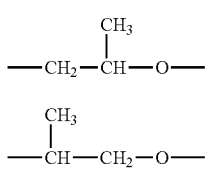

In embodiments of the present disclosure, the AO group may also be described as in formulas IVa and IVb

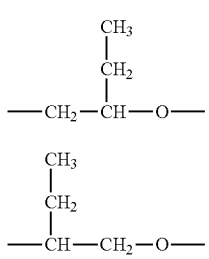

In embodiments of the present disclosure, the AO group may also be described as any combination of formulas II, IIIa, IIIb, IVa and IVb.

In embodiments of the present disclosure, each n in formula (I) is independently 52 to 150. In some embodiments, each n may be 52, 53, 54, 55, 56, 57, 58, or 59. In some embodiments, each n may be 60, 61, 62, 63, 64, 65, 66, 67, 68, or 69. In some embodiments, each n may be 70, 71, 72, 73, 74, 75, 76, 77, 78, or 79. In some embodiments, each n may be 80, 81, 82, 83, 84, 85, 86, 87, 88, or 89. In some embodiments, each n may be 90, 91, 92, 93, 94, 95, 96, 97, 98, or 99. In some embodiments, each n may be 100, 101, 102, 103, 104, 105, 106, 107, 108, or 109. In some embodiments, each n may be 110, 111, 112, 113, 114, 115, 116, 117, 118, or 119. In some embodiments, each n may be 120, 121, 122, 123, 124, 125, 126, 127, 128, or 129. In some embodiments, each n may be 130, 131, 132, 133, 134, 135, 136, 137, 138, or 139. In some embodiments, each n may be 140, 141, 142, 143, 144, 145, 146, 147, 148, 149 or 150.

The value of n in formula (I) may also be expressed as an average of all three independent n values for $R_1$, $R_2$ and $R_3$. Each independent value of n for $R_1$, $R_2$ and $R_3$ will be integers. However, the average n values for $R_1$, $R_2$ and $R_3$ may equal non-integer numbers such as 59.8, 63.7, 70.7, 76.4 or 84.9. The average n values include the numbers listed in the preceding paragraph along with their fractions which may be listed as decimal numbers.

According to some embodiments of the present disclosure, the range of n in formula (I) may include any of the numbers listed in the previous paragraphs that lists the values of n. According to some embodiments of the present disclosure, each n is independently 52 to 150. According to some embodiments of the present disclosure, each n is independently 60 to 150. According to some embodiments of the present disclosure, each n is independently 70 to 150. According to some embodiments of the present disclosure, each n is independently 52 to 140. According to some embodiments of the present disclosure, each n is independently 60 to 140. According to some embodiments of the present disclosure, each n is independently 70 to 140. According to some embodiments of the present disclosure, each n is independently 52 to 130. According to some embodiments of the present disclosure, each n is independently 60 to 130. According to some embodiments of the present disclosure, each n is independently 70 to 130. According to some embodiments of the present disclosure, each n is independently 52 to 120. According to some embodiments of the present disclosure, each n is independently 60 to 120. According to some embodiments of the present disclosure, each n is independently 70 to 120. According to some embodiments of the present disclosure, each n is independently 52 to 110. According to some embodiments of the present disclosure, each n is independently 60 to 110. According to some embodiments of the present disclosure, each n is independently 70 to 110. According to some embodiments of the present disclosure, each n is independently 52 to 100. According to some embodiments of the present disclosure, each n is independently 60 to 100. According to some embodiments of the present disclosure, each n is independently 70 to 100. According to some embodiments of the present disclosure, each n is independently 52 to 90. According to some embodiments of the present disclosure, each n is independently 60 to 90. According to some embodiments of the present disclosure, each n is independently 65 to 90. According to some embodiments of the present disclosure, each n is independently 70 to 90. According to some embodiments of the present disclosure, each n is independently 52 to 85. According to some embodiments of the present disclosure, each n is independently 57 to 85. According to some embodiments of the present disclosure, each n is independently 60 to 85. According to some embodiments of the present disclosure, each n is independently 65 to 85. According to some embodiments of the present disclosure, each n is independently 52 to 80. According to some embodiments of the present disclosure, each n is independently 55 to 80. According to some embodiments of the present disclosure, each n is independently 60 to 80. According to some embodiments of the present disclosure, each n is independently 65 to 80. According to some embodiments of the present disclosure, each n is independently 80 to 150. According to some embodiments of the present disclosure, each n is independently 90 to 150. According to some embodiments of the present disclosure, each n is independently 100 to 150. According to some embodiments of the present disclosure, each n is independently 110 to 150. According to some embodiments of the present disclosure, each n is independently 120 to 150. According to some embodiments of the present disclosure, each n is independently 130 to 150. According to some embodiments of the present disclosure, each n is independently 135 to 150. According to some embodiments of the present disclosure, each n is independently 80 to 120. According to some embodiments of the present disclosure, each n is independently 90 to 120. According to some embodiments of the present disclosure, each n is independently 100 to 120.

In embodiments of the present disclosure, the $(AO)_n$ unit in the formulas —$O(AO)_nH$ or —$O(AO)_n(EO)_pH$ may be EO groups (formula II), PO groups (formulas IIIa and IIIb), BO groups (formulas IVa and IVb), block EO/PO mixtures (formulas II, IIIa and IIIb), block EO/BO mixtures (formulas II, IVa and IVb), block PO/BO mixtures (formulas IIIa, IIIb, IVa and IVb), block EO/PO/BO mixtures (formulas II, IIIa, IIIb, IVa and IVb), random EO/PO mixtures (formulas II, IIIa and IIIb), random EO/BO mixtures (formulas II, IVa and IVb), random PO/BO mixtures (formulas IIIa, IIIb, IVa and IVb), random EO/PO/BO mixtures (formulas II, IIIa, IIIb, IVa and IVb), and combinations thereof.

By a "block mixture", it is meant that $(AO)_n$ may comprise of groups of certain AO units followed by groups of other AO units. For example, a representative block EO/PO mixture may be $(EO)_5(PO)_{10}$ or $(PO)_5(EO)_{10}$. These block mixtures may contain multiple groups of differing AO units. Other representative block EO/PO mixtures may be $(EO)_7(PO)_{12}(EO)_5$ or $(PO)_3(EO)_6(PO)_2(EO)_{20}(PO)_5$. These block mixtures may be produced by loading a first AO to react with the glycerine and once that reaction is completed, then adding a different AO unit to that reaction product.

By a "random mixture", it is meant that $(AO)_n$ may comprise differing AO units in no set order. For example, a representative random EO/PO mixture may be $(EO)(PO)_2(EO)(PO)(EO)_3(PO)_2(EO)(PO)_3$. These may be produced by loading at least two different AO units (different AO species) to react with the glycerine. These may also be produced by loading at least two different AO units to an existing glycerine-polyalkylene reaction product.

In certain embodiments, the $(AO)_n$ unit in the formula —$O(AO)_nH$ may be mixtures of EO groups (formula II) and PO groups (formulas IIIa and IIIb) in a ratio of EO:PO of about 1:1, about 2:1, about 3:1, about 4:1, about 5:1, about 6:1, about 7:1, about 8:1, about 9:1, or about 10:1.

In certain embodiments, each of $R_1$, $R_2$ and $R_3$ of formula (I) is independently —$O(AO)_n(EO)_pH$. Here, p is independently from 1 to 150 and the value of n+p is from 52 to 150. In these embodiments, the terminal units of the $R_1$, $R_2$ and $R_3$ groups are either one or more EO units. As with the n values, each independent p value will be an integer. However, when discussing the value of p for the entire formula, an average value of $R_1$, $R_2$ and $R_3$ may be used, in which case the p value may be an average value that is a non-integer, such as 60.5.

In embodiments of the present disclosure, each p is independently 1 to 150. In some embodiments, each p may be 1, 2, 3, 4, 5, 6, 7, 8, or 9. In some embodiments, each p may be 10, 11, 12, 13, 14, 15, 16, 17, 18, or 19. In some embodiments, each p may be 20, 21, 22, 23, 24, 25, 26, 27, 28, or 29. In some embodiments, each p may be 30, 31, 32, 33, 34, 35, 36, 37, 38, or 39. In some embodiments, each p may be 40, 41, 42, 43, 44, 45, 46, 47, 48, or 49. In some embodiments, each p may be 50, 51, 52, 53, 54, 55, 56, 57, 58, or 59. In some embodiments, each p may be 60, 61, 62, 63, 64, 65, 66, 67, 68, or 69. In some embodiments, each p may be 70, 71, 72, 73, 74, 75, 76, 77, 78, or 79. In some embodiments, each p may be 80, 81, 82, 83, 84, 85, 86, 87, 88, or 89. In some embodiments, each p may be 90, 91, 92, 93, 94, 95, 96, 97, 98, or 99. In some embodiments, each p may be 100, 101, 102, 103, 104, 105, 106, 107, 108, or 109. In some embodiments, each p may be 110, 111, 112, 113, 114, 115, 116, 117, 118, or 119. In some embodiments, each p may be 120, 121, 122, 123, 124, 125, 126, 127, 128, or 129. In some embodiments, each p may be 130, 131, 132, 133, 134, 135, 136, 137, 138, or 139. In some embodiments, each p may be 140, 141, 142, 143, 144, 145, 146, 147, 148, 149 or 150.

According to some embodiments of the present disclosure, the range of p may include any of the numbers listed in the previous paragraphs that lists the values of p. According to some embodiments of the present disclosure, each p is independently 1 to 150. According to some embodiments of the present disclosure, each p is independently 1 to 140. According to some embodiments of the present disclosure, each p is independently 1 to 130. According to some embodiments of the present disclosure, each p is independently 1 to 120. According to some embodiments of the present disclosure, each p is independently 1 to 110. According to some embodiments of the present disclosure, each p is independently 1 to 100. According to some embodiments of the present disclosure, each p is independently 1 to 90. According to some embodiments of the present disclosure, each p is independently 1 to 60. According to some embodiments of the present disclosure, each p is independently 1 to 30. According to some embodiments of the present disclosure, each p is independently 30 to 150. According to some embodiments of the present disclosure, each p independently 60 to 150. According to some embodiments of the present disclosure, each p is independently 90 to 150. According to some embodiments of the present disclosure, each p independently 120 to 150. According to some embodiments of the present disclosure, each p is independently 30 to 60. According to some embodiments of the present disclosure, each p is independently 15 to 45. According to some embodiments of the present disclosure, each p is independently 45 to 75. According to some embodiments of the present disclosure, each p is independently 60 to 120. According to some embodiments of the present disclosure, each p independently 80 to 120.

In some embodiments, the value of n+p is 52, 53, 54, 55, 56, 57, 58, or 59. In some embodiments, the value of n+p is 60, 61, 62, 63, 64, 65, 66, 67, 68, or 69. In some embodiments, the value of n+p is 70, 71, 72, 73, 74, 75, 76, 77, 78, or 79. In some embodiments, the value of n+p is 80, 81, 82, 83, 84, 85, 86, 87, 88, or 89. In some embodiments, the value of n+p is 90, 91, 92, 93, 94, 95, 96, 97, 98, or 99. In some embodiments, the value of n+p is may be 100, 101, 102, 103, 104, 105, 106, 107, 108, or 109. In some embodiments, the value of n+p is 110, 111, 112, 113, 114, 115, 116, 117, 118, or 119. In some embodiments, the value of n+p is 120, 121, 122, 123, 124, 125, 126, 127, 128, or 129. In some embodiments, the value of n+p is 130, 131, 132, 133, 134, 135, 136, 137, 138, or 139. In some embodiments, the value of n+p is 140, 141, 142, 143, 144, 145, 146, 147, 148, 149 or 150.

According to some embodiments of the present disclosure, the range of n+p may include any of the numbers listed in the previous paragraphs that lists the values of n+p. According to some embodiments of the present disclosure, the value of n+p is 52 to 150. According to some embodiments of the present disclosure, the value of n+p is 52 to 140. According to some embodiments of the present disclosure, the value of n+p is 52 to 130. According to some embodiments of the present disclosure, the value of n+p is 52 to 120. According to some embodiments of the present disclosure, the value of n+p is 52 to 110. According to some embodiments of the present disclosure, the value of n+p is 52 to 100. According to some embodiments of the present disclosure, the value of n+p is 52 to 90. According to some embodiments of the present disclosure, the value of n+p is 60 to 150. According to some embodiments of the present disclosure, the value of n+p is 60 to 140. According to some embodiments of the present disclosure, the value of n+p is 60 to 130. According to some embodiments of the present disclosure, the value of n+p is 60 to 120. According to some embodiments of the present disclosure, the value of n+p is 60 to 110. According to some embodiments of the present disclosure, the value of n+p is 60 to 100. According to some embodiments of the present disclosure, the value of n+p is 70 to 150. According to some embodiments of the present disclosure, the value of n+p is 70 to 140. According to some embodiments of the present disclosure, the value of n+p is 70 to 130. According to some embodiments of the present disclosure, the value of n+p is 70 to 120. According to some embodiments of the present disclosure, the value of n+p is 70 to 110. According to some embodiments of the present disclosure, the value of n+p is 70 to 100. According to some embodiments of the present disclosure, the value of n+p is 90 to 150. According to some embodiments of the present disclosure the value of n+p is 120 to 150. According to some embodiments of the present disclosure, the value of n+p is 80 to 120.

In embodiments of the present disclosure, the silica coagulant has a molecular weight above 7,000. In some embodiments, the silica coagulant has a molecular weight above 7,500. In some embodiments, the silica coagulant has a molecular weight above 8,000. In some embodiments, the silica coagulant has a molecular weight above 8,500. In some embodiments, the silica coagulant has a molecular weight above 9,000. In some embodiments, the silica coagulant has a molecular weight above 9,500. In some embodiments, the silica coagulant has a molecular weight above 10,000. In some embodiments, the silica coagulant has a molecular weight above 10,500. In some embodiments, the silica coagulant has a molecular weight above 11,000. In some embodiments, the silica coagulant has a molecular weight above 11,500. In some embodiments, the silica coagulant has a molecular weight above 12,000. In some embodiments, the silica coagulant has a molecular weight above 12,500. In some embodiments, the silica coagulant has a molecular weight above 13,000. In some embodiments, the silica coagulant has a molecular weight above 13,500. In some embodiments, the silica coagulant has a molecular weight above 14,000. In some embodiments, the silica coagulant has a molecular weight above 14,500. In some embodiments, the silica coagulant has a molecular weight above 15,000. In some embodiments, the silica coagulant has a molecular weight above 15,500. In some embodiments, the silica coagulant has a molecular weight above 16,000. In some embodiments, the silica coagulant has a molecular weight above 16,500. In some embodiments, the silica coagulant has a molecular weight above 17,000. In some embodiments, the silica coagulant has a molecular weight above 17,500. In some embodiments, the silica coagulant has a molecular weight above 18,000. In some embodiments, the silica coagulant has a molecular weight above 18,500. In some embodiments, the silica coagulant has a molecular weight above 19,000. In some embodiments, the silica coagulant has a molecular weight above 19,500.

In embodiments of the present disclosure, the silica coagulant has a molecular weight from about 7,000 to about 20,000. In some embodiments, the silica coagulant has a molecular weight from about 7,000 to about 19,000. In some embodiments, the silica coagulant has a molecular weight from about 7,000 to about 18,000. In some embodiments, the silica coagulant has a molecular weight from about 7,000 to about 17,000. In some embodiments, the silica coagulant has a molecular weight from about 7,000 to about 16,000. In some embodiments, the silica coagulant has a molecular weight from about 7,000 to about 15,000. In some embodiments, the silica coagulant has a molecular weight from about 7,000 to about 14,000. In some embodiments, the silica coagulant has a molecular weight from about 7,000 to about 13,000. In some embodiments, the silica coagulant has a molecular weight from about 7,000 to about 12,000. In some embodiments, the silica coagulant has a molecular weight from about 7,000 to about 11,000. In some embodiments, the silica coagulant has a molecular weight from about 7,000 to about 10,000. In some embodiments, the silica coagulant has a molecular weight from about 7,000 to about 9,000.

In embodiments of the present disclosure, the silica coagulant has a molecular weight from about 8,000 to about 20,000. In some embodiments, the silica coagulant has a molecular weight from about 8,000 to about 19,000. In some embodiments, the silica coagulant has a molecular weight from about 8,000 to about 18,000. In some embodiments, the silica coagulant has a molecular weight from about 8,000 to about 17,000. In some embodiments, the silica coagulant has a molecular weight from about 8,000 to about 16,000. In some embodiments, the silica coagulant has a molecular weight from about 8,000 to about 15,000. In some embodiments, the silica coagulant has a molecular weight from about 8,000 to about 14,000. In some embodiments, the silica coagulant has a molecular weight from about 8,000 to about 13,000. In some embodiments, the silica coagulant has a molecular weight from about 8,000 to about 12,000. In some embodiments, the silica coagulant has a molecular weight from about 8,000 to about 11,000. In some embodiments, the silica coagulant has a molecular weight from about 8,000 to about 10,000. In some embodiments, the silica coagulant has a molecular weight from about 8,000 to about 9,000.

In embodiments of the present disclosure, the silica coagulant has a molecular weight from about 9,000 to about 20,000. In some embodiments, the silica coagulant has a molecular weight from about 9,000 to about 19,000. In some embodiments, the silica coagulant has a molecular weight from about 9,000 to about 18,000. In some embodiments, the silica coagulant has a molecular weight from about 9,000 to about 17,000. In some embodiments, the silica coagulant has a molecular weight from about 9,000 to about 16,000. In some embodiments, the silica coagulant has a molecular weight from about 9,000 to about 15,000. In some embodiments, the silica coagulant has a molecular weight from about 9,000 to about 14,000. In some embodiments, the silica coagulant has a molecular weight from about 9,000 to about 13,000. In some embodiments, the silica coagulant has a molecular weight from about 9,000 to about 12,000. In some embodiments, the silica coagulant has a molecular weight from about 9,000 to about 11,000. In some embodiments, the silica coagulant has a molecular weight from about 9,000 to about 10,000.

In embodiments of the present disclosure, the silica coagulant has a molecular weight from about 10,000 to about 20,000. In some embodiments, the silica coagulant has a molecular weight from about 10,000 to about 19,000. In some embodiments, the silica coagulant has a molecular weight from about 10,000 to about 18,000. In some embodiments, the silica coagulant has a molecular weight from about 10,000 to about 17,000. In some embodiments, the silica coagulant has a molecular weight from about 10,000 to about 16,000. In some embodiments, the silica coagulant has a molecular weight from about 10,000 to about 15,000. In some embodiments, the silica coagulant has a molecular weight from about 10,000 to about 14,000. In some embodiments, the silica coagulant has a molecular weight from about 10,000 to about 13,000. In some embodiments, the silica coagulant has a molecular weight from about 10,000 to about 12,000. In some embodiments, the silica coagulant has a molecular weight from about 10,000 to about 11,000. In some embodiments, the silica coagulant has a molecular weight from about 11,000 to about 20,000. In embodiments of the present disclosure, the silica coagulant has a molecular weight from about 12,000 to about 20,000. In some embodiments, the silica coagulant has a molecular weight from about 15,000 to about 20,000.

In embodiments of the present disclosure, a silica agglomeration composition includes water. For the purposes of this disclosure, "water" generally refers to any aqueous medium. In one embodiment, the water may be distilled water, potable water or any combination thereof. In embodiments, the water may be soft water, hard water, reclaimed water, tap water, purified water or any combination thereof.

In embodiments of the present disclosure, the silica coagulant is dissolved in the water at a weight ratio of silica coagulant to water of about 54% or higher. In some embodiments, the silica coagulant is dissolved in the water at a weight ratio of silica coagulant to water of about 55% or higher. In some embodiments, the silica coagulant is dissolved in the water at a weight ratio of silica coagulant to water of about 56% or higher. In some embodiments, the silica coagulant is dissolved in the water at a weight ratio of silica coagulant to water above of about 57% or higher. In some embodiments, the silica coagulant is dissolved in the water at a weight ratio of silica coagulant to water above of about 58% or higher. In some embodiments, the silica coagulant is dissolved in the water at a weight ratio of silica coagulant to water of about 59% or higher. In some embodiments, the silica coagulant is dissolved in the water at a weight ratio of silica coagulant to water of about 60% or higher. In some embodiments, the silica coagulant is dissolved in the water at a weight ratio of silica coagulant to water of about 61% or higher. In some embodiments, the silica coagulant is dissolved in the water at a weight ratio of silica coagulant to water of about 62% or higher. In some embodiments, the silica coagulant is dissolved in the water at a weight ratio of silica coagulant to water above of about 63% or higher. In some embodiments, the silica coagulant is dissolved in the water at a weight ratio of silica coagulant to water above of about 64% or higher. In some embodiments, the silica coagulant is dissolved in the water at a weight ratio of silica coagulant to water of about 65% or higher. In some embodiments, the silica coagulant is dissolved in the water at a weight ratio of silica coagulant to water of about 66% or higher. In some embodiments, the silica coagulant is dissolved in the water at a weight ratio of silica coagulant to water above of about 67% or higher. In some embodiments, the silica coagulant is dissolved in the water at a weight ratio of silica coagulant to water above of about 68% or higher. In some embodiments, the silica coagulant is dissolved in the water at a weight ratio of silica coagulant to water of about 69% or higher. In some embodiments, the silica coagulant is dissolved in the water at a weight ratio of silica coagulant to water of about 70% or higher. The silica coagulant is dissolved in the water at ambient temperature (about 20° C.).

In embodiments of the present disclosure, the silica coagulant is dissolved in the water at a weight ratio of silica coagulant to water at a range of from about 54% to about 70%. In some embodiments, the silica coagulant is dissolved in the water at a weight ratio of silica coagulant to water at a range of from about 56% to about 70%. In some embodiments, the silica coagulant is dissolved in the water at a weight ratio of silica coagulant to water at a range of from about 58% to about 70%. In some embodiments, the silica coagulant is dissolved in the water at a weight ratio of silica coagulant to water at a range of from about 60% to about 70%. The silica coagulant is dissolved in the water at ambient temperature (about 20° C.).

In certain embodiments, the silica coagulant of the present disclosure may be more soluble in an aqueous medium, such as water, when compared to an unmodified linear PEG molecule of equivalent weight. A higher solubility advantageously allows an improved supply of the silica coagulant. The higher concentration of the silica coagulant achieved provides a reduction in handling and transportation costs as a lesser volume of water is needed to supply an equivalent amount of the silica coagulant compared to that of a linear PEG molecule, to the end user.

In an embodiment, the silica agglomeration composition is prepared by loading the silica coagulant into a container and adding potable water without requiring any further water treatment.

In certain embodiments, the silica agglomeration composition may optionally comprise one or more additives such as preservatives or flocculants.

In one embodiment, the silica agglomeration composition may be contained in any appropriate container used to store and/or transport chemical materials, such as an Intermediate Bulk Container (IBC), a drum, a flexi-bag, an ISO tank container, or a bulk tanker. In some embodiments, the silica agglomeration composition may be in an IBC. The IBC may be of any standard size having a capacity of, for example, 681 litres (180 gallons), 946 litres (250 gallons), 1,040 litres (275 gallons), 1,136 litres (300 gallons), 1,249 litres (330 gallons), 1,325 litres (350 gallons), 1,703 litres (450 gallons), or 2,082 litres (550 gallons). When the silica coagulant is dissolved in water, the concentration of the silica coagulant in water may be from about 54% to about 70%. In an embodiment, the concentration of the silica coagulant in water may be at a concentration of about 60%. The silica agglomeration composition, when supplied in a container, typically provides a higher concentration of the silica coagulant for storage and transportation. A higher concentration capacity of the silica coagulant in water may allow more active silica coagulant compound to be deliverable per container unit, thereby reducing overall water volume usage and transportation costs compared with an unmodified linear PEG molecule of equivalent PEG weight.

Preparation of Silica Coagulant

The silica coagulant of the present disclosure may be prepared by methods know in the art such as the alkoxylation of alcohols. In an embodiment, the silica coagulant is a reaction product of glycerine and alkylene oxide. Glycerine is show in the following formula (V):

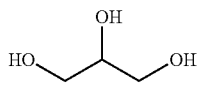

This alkoxylation reaction may be performed with an aqueous KOH (or NaOH) catalyst. In some embodiments, the reaction may involve a solvent. Typical solvents may include water, low molecular weight ethylene glycol, glyme (such as dimethoxy ethane), or tetrahydrofuran (THF). In some embodiments, the reaction may be solvent-free.

In some embodiments, the method further comprises heating a reaction mixture to a temperature of between about 100° C. and 180° C., typically between about 140° C. and 160° C., more typically at about 145° C.

In some embodiments, the alkoxylation reaction may be performed in multiple stages to get the desired blocks of EO, PO and/or BO. The reaction vessel may be loaded with glycerine and PO initially. Once that reaction product has been produced, then the reaction vessel may be loaded with EO, PO or BO. In such a manner, blocks of EO, PO and BO may be formed. In some embodiments, random mixtures of EO, PO and/or BO may be produced by loading the reaction vessel with mixtures of EO, PO and/or BO.

Alkoxylation reactions are well known in the art. A silica coagulant of the present disclosure is typically synthesized by reacting glycerine with alkylene oxides to form alkyl polyether chains extending from the glycerine core. The alkylene oxide or a mixture of alkylene oxides, is added to the glycerine to form a reaction mixture that yields the silica coagulant. Preferably, the glycerine is dried in the reaction vessel before alkylene oxides are added. The alkylene oxides include EO, PO, BO and any mixtures thereof. In certain embodiments, the molar ratio of alkylene oxides used in the reaction will generally be in line with the ratio of alkylene oxides present in the synthesized silica coagulant.

The alkyl polyether chains of the silica coagulant may comprise random or block alkylene oxide units in any length as required. Blocks of alkylene oxide units may be formed by sequentially adding different alkylene oxides, or a mixture of different alkylene oxides, to the reaction mixture, reacting each set of alkylene oxides to completion, and removing any unreacted alkylene oxide monomers from the reaction before adding the next set of alkylene oxide or mixture.

Alkylene oxides may be contained in separate storage vessels maintained under nitrogen pressure and fed into the reaction vessel through a feed line. Alternatively, alkylene oxides may be fed into the reaction vessel by using high pressure pumps attached to the feed line. Alkylene oxide feed rates may be controlled by mass flow meters and proportional flow control valves, and preferably is programmed to automatically feed the required amounts of EU, PO and/or BO such that the required ratio of alkylene oxides is fed into the reaction vessel. Feed rates may also assist in controlling the required reaction temperature and pressure in the reaction vessel.

Any residual or unreacted alkylene oxide monomers may be removed by evaporation and stripping with inert gas, such as nitrogen or argon.

The alkoxylation reaction may be performed in liquid or gas phase. Reaction temperatures are typically in the range of 120° C. to 150° C., depending on the alkylene oxide being polymerized. At this temperature range, reaction vessels capable of handling high pressures are preferably used. The choice of catalyst will depend on the alkylene oxide being used. Preferably, a strong base is used, such as potassium hydroxide. More preferably, a high-loading amount of catalyst is used. The catalyst may be introduced as a solution in a solvent, and the solvent may be removed before the alkylene oxide (or a mixture of alkylene oxides) is introduced into the reaction vessel.

In other embodiments, the silica coagulant may be prepared by the alkoxylated reaction product of: (i) a glycerin-polyalkylene oxide of about 1,100 molecular weight; and (ii) an alkylene oxide, to form a silica coagulant of 7,000 to 20,000 molecular weight, or in some embodiments a silica coagulant of 8,000 to 12,000 molecular weight. In some embodiments, the silica coagulant may comprise an ethoxylated reaction product of: (i) a glycerin-poly[ethylene oxide/propylene oxide] of about 1,100 molecular weight with a random EO:PO ratio of about 3:1; and (ii) ethylene oxide, to form a silica coagulant of 8,000 to 11,000 molecular weight. A readily available glycerin-poly[ethylene oxide/propylene oxide] of about 1,100 molecular weight is an intermediate in the manufacture of many polyurethane polyols.

In one embodiment, the silica coagulant may be prepared by the alkoxylated reaction product of: (i) a glycerin-poly[ethylene oxide/propylene oxide] that has a molecular weight of 1,000 to 2,000 and an EO:PO ratio range of from 1:0 to 0:1; and (b) ethylene oxide, wherein the silica coagulant formed has a molecular weight of 8,000 to 11,000.

INDUSTRIAL APPLICATION

The silica coagulant, as disclosed herein, when used in an effective amount is useful in the coagulation of silica particles in aqueous mineral process streams, such as hydrometallurgical process streams, for subsequent removal by filtration and/or decantation.

In embodiments of the present disclosure, a method for agglomerating silica particles is disclosed. A silica coagulant, as described in the above embodiments, is contacted with the silica particles in the aqueous mineral process stream to form agglomerated silica particles.

In another embodiment of the present disclosure, at least one flocculant agent may be added to the aqueous mineral process stream and contacted with the agglomerated silica particles to promote flocculation of the agglomerated silica particles. The flocculant agents may include a particulate material, a polymeric flocculant and combinations thereof.

In another embodiment, the method further includes the step of removing the agglomerated silica particles from the aqueous mineral process stream. This may be done by numerous processes known to those skilled in the art and may include filtering, settling, flocculating, and combinations thereof.

In an embodiment, mining operations where the present disclosure may be useful include, but are not limited to, aqueous mineral process streams comprising copper (Cu), gold (Au), nickel (Ni), uranium (U), zinc (Zn), silver (Ag), lead (Pb), molybdenum (Mo), lithium (Li), titanium (Ti), zirconium (Zr), cobalt (Co), and rare earths including cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). Other mining operations will be appreciated by those skilled in the art.

In an embodiment, the method of contacting a silica coagulant of the present disclosure, as described in any of the above embodiments, with silica particles, may be at a dose of about 50 to 200 ppm. In certain embodiments, the method of contacting a silica coagulant of the present disclosure, as described in any of the above embodiments, with silica particles, may be at a dose of about 100 ppm. In other embodiments, the method of contacting a silica coagulant of the present disclosure, as described in any of the above embodiments, with silica particles, may be at a dose of about 150 ppm. In certain other embodiments, the method of contacting a silica coagulant of the present disclosure, as described in any of the above embodiments, with silica particles, may be at a dose of about 200 ppm.

This disclosure is further illustrated by the following examples. While the Examples are provided to illustrate the invention, they are not intended to limit it.

EXAMPLES

Example 1

Preparation and Testing of Glycerin-Polyalkylene Oxide ("Example 1").

An embodiment of the present disclosure, "Example 1", was prepared according to the following process and tested against a standard, commercially available, unmodified linear PEG molecule of 9000 molecular weight ("PEG 9000"). The PEG 9000 used for the following tests is commercially available from Indorama Ventures Oxides Australia Pty Limited of Brooklyn, Victoria, Australia.

A glycerin-based high build alkoxylate sample was prepared by initially reacting glycerin with an ethylene oxide:propylene oxide (3:1) mixture at a temperature of 125° C. to form an intermediate glycerin-polyalkylene oxide of about 1100 Mw. The intermediate glycerin-polyalkylene oxide was further ethoxylated in a two-stage process with ethylene oxide at a temperature of 145° C., to form an intermediate glycerin-polyalkylene oxide of about 5000 Mw, which is further ethoxylated at a temperature of 145° C. to form the target glycerin-polyalkylene oxide of about 9000 Mw. The final molecular weight of Example 1 was measured to be approximately 8118.7. Example 1 equates to formula (I) wherein each of $R_1$, $R_2$ and $R_3$ is of the formula —O(AO)$_n$(EO)$_p$H where (AO)$_n$ is a random EO/PO mixture with n on average about 7.4 and p on average about 53. The properties of Example 1 are shown in Table 1.

TABLE 1

| Properties of Example 1. | |
|---|---|
| Properties | Example 1 |
| Appearance: | Clear viscous liquid |
| Solubility, Active content (w/w): | 60% w/w in water |
| Density (g/ml) at 20° C.: | 1.104 g/ml |

TABLE 1-continued

| Properties of Example 1. | |
|---|---|
| Properties | Example 1 |
| Viscosity (cps) at 20° C.: | 575 cps |
| Pour Point (° C.): | Less than 0° C.: |

The active content was calculated by diluting Example 1 with water to check its maximum solubility. It should be noted that the active content of Example 1 was fully soluble at 60% w/w in water, rather PEG 9000 is only able to reach an active content of around 50-52% w/w in water. Therefore, Example 1 has clear transportation and freight benefits for a remote mine site user. Typically, such silica agglomeration compositions would be made in a major city industrial/manufacturing centre and then transported great distances across land and/or sea to the end user.

The ability of Example 1 to coagulate silica particulates was tested at a hydrometallurgical processing stream. Example 1 demonstrated an equivalent or even slightly better performance of coagulating colloidal silica for its removal, compared to PEG 9000 molecule, on a dose of actives basis. No detriment to Solvent Extraction Phase Disengagement tests were observed using Example 1.

Dose Response Testing—Jar Test Dose Method

Dose response tests were conducted on Example 1 and PEG 9000 with a jar test apparatus using the following procedure.

1. Clarifier feed was stirred at 200 revolutions per minute (RPM) in a beaker.
2. Seed solids (CCD1 feed*) were added at 15 kg/m³ (suspended in a baffled bucket prior to sampling).
   Counter Current Decanter 1 from a standard CCD circuit used in hydrometallurgical process
3. The coagulant (Example 1 or PEG 9000) was added and allowed to stir for 60 seconds.
4. Polyacrylamide flocculant was dosed at 550 g flocculant/tonne solids. The stirrer was run for 15 seconds and then for a further 30 seconds at 60 RPM.
5. The sample was allowed to settle for 10 minutes before the supernatant was sampled for turbidity measurement and assay.
6. A stabilizing dilution was completed with a mechanical diluter. The sample was also filtered with a 0.1 μm syringe filter for determination of soluble silica and colloidal silica by difference.

Figure 2:
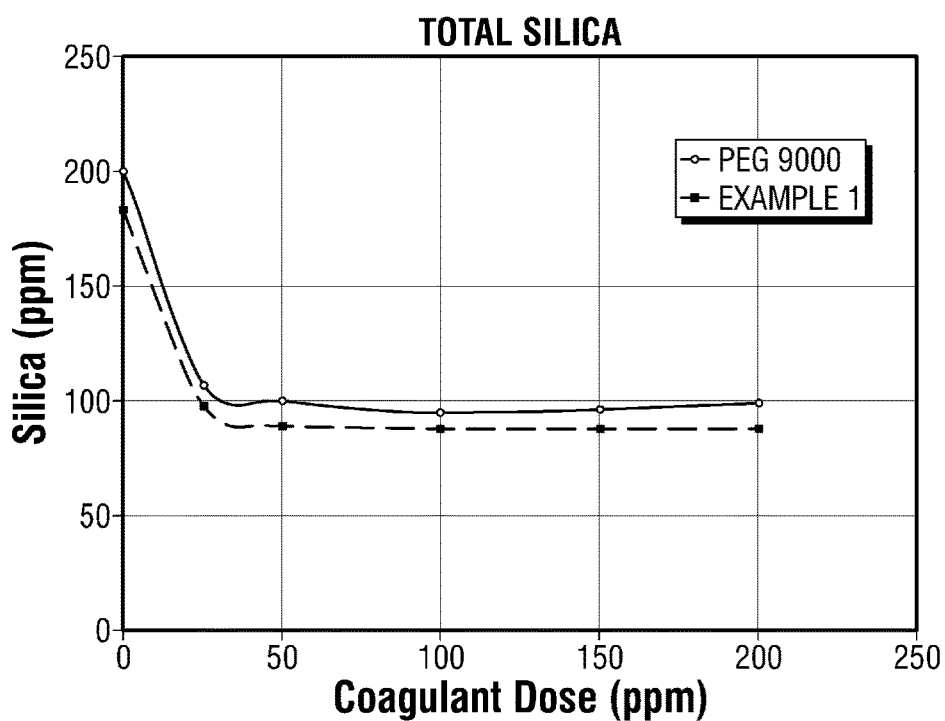
FIG. 2 shows total silica results by dosage of Example 1 in comparison to PEG 9000.
Figure 3:
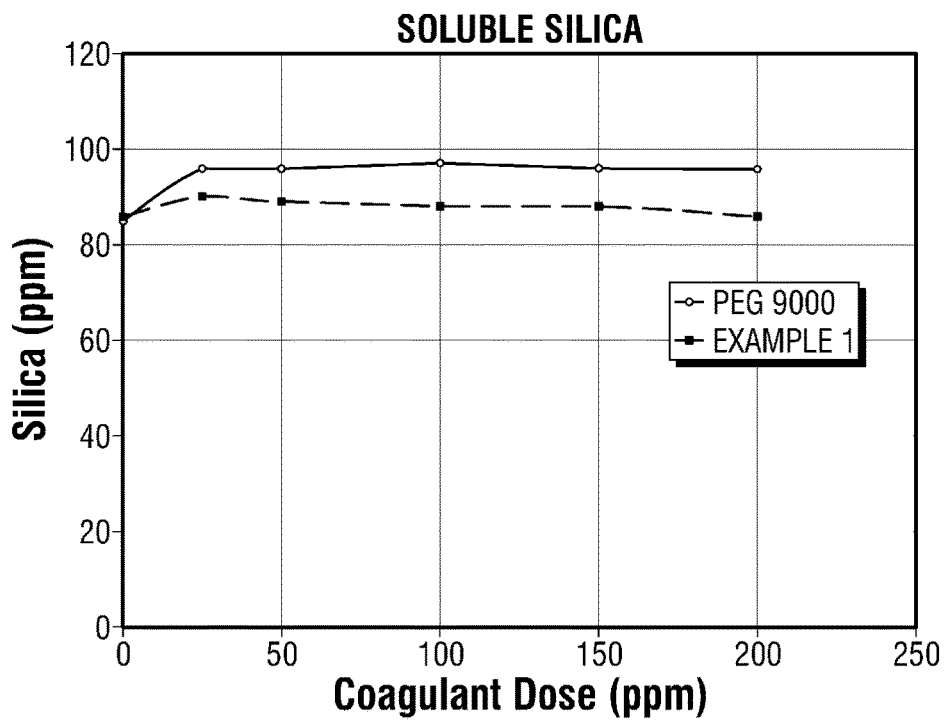
FIG. 3 shows soluble silica results by dosage of Example 1 in comparison to PEG 9000.
Figure 4:
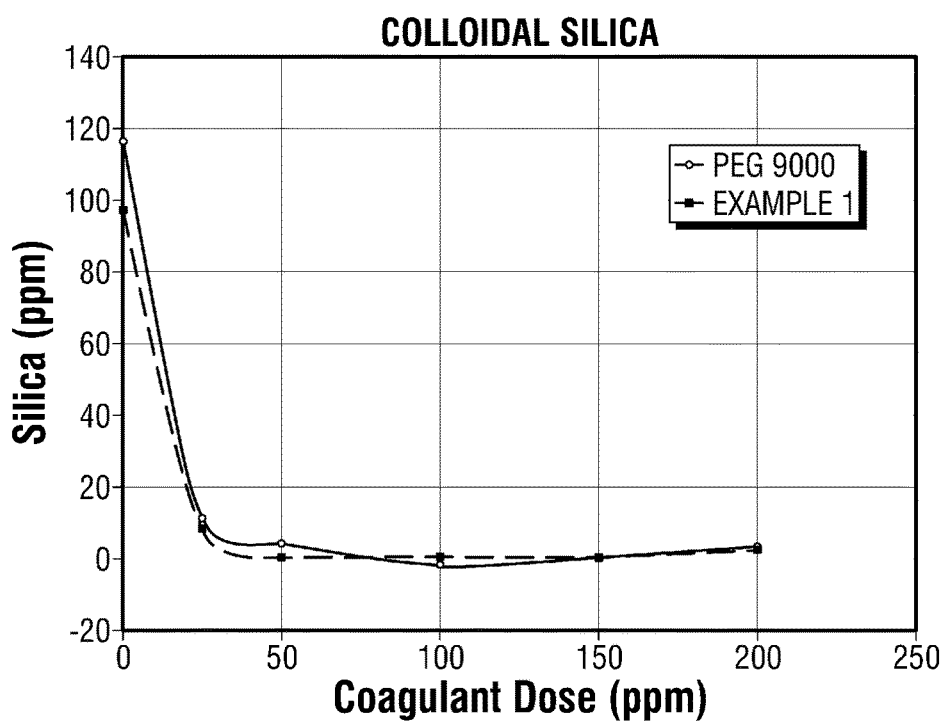
FIG. 4 shows colloidal silica results by dosage of Example 1 in comparison to PEG 9000.

The dose response testing was run with both PEG 9000 and Example 1. FIG. 1 and Table 2 show the results of turbidity. FIG. 2 and Table 3 show the results of total silica. FIG. 3 and Table 4 show the results of soluble silica. FIG. 4 and Table 5 show the results of colloidal silica.

TABLE 2

| Comparison of Turbidity results between Example 1 and PEG 9000. | | |
|---|---|---|
| Coagulant Dose (ppm) | Turbidity (NTU) from Example 1 | Turbidity (NTU) from PEG 9000 |
| 0 | 486 | 517 |
| 25 | 341 | 388 |
| 50 | 156 | 164 |
| 100 | 141 | 144 |
| 150 | 141 | 161 |
| 200 | 191 | 138 |

TABLE 3

Comparison of Total Silica results between Example 1 and PEG 9000.

| Coagulant Dose (ppm) | Total Silica (ppm) from Example 1 | Total Silica (ppm) from PEG 9000 |
|---|---|---|
| 0 | 183 | 201 |
| 25 | 98 | 107 |
| 50 | 89 | 100 |
| 100 | 88 | 95 |
| 150 | 88 | 96 |
| 200 | 88 | 99 |

TABLE 4

Comparison of Soluble Silica results between Example 1 and PEG 9000.

| Coagulant Dose (ppm) | Soluble Silica (ppm) from Example 1 | Soluble Silica (ppm) from PEG 9000 |
|---|---|---|
| 0 | 86 | 85 |
| 25 | 90 | 96 |
| 50 | 89 | 96 |
| 100 | 88 | 97 |
| 150 | 88 | 96 |
| 200 | 86 | 96 |

TABLE 5

Comparison of Colloidal Silica results between Example 1 and PEG 9000.

| Coagulant Dose (ppm) | Colloidal Silica (ppm) from Example 1 | Colloidal Silica (ppm) from PEG 9000 |
|---|---|---|
| 0 | 97 | 116 |
| 25 | 8 | 11 |
| 50 | 0 | 4 |
| 100 | 0 | -2 |
| 150 | 0 | 0 |
| 200 | 2 | 3 |

The above Tables 2-5 and FIGS. 1-4 demonstrate that Example 1 performs comparably to PEG 9000, a known, commercially available linear PEG molecule of equivalent weight, or even better as evidenced in the decreasing Turbidity and Colloidal Silica reduction with increasing coagulant dosage.

Example 2

Preparation and Testing of Glycerin-Ethylene Oxide ("Example 2").

Figure 5:
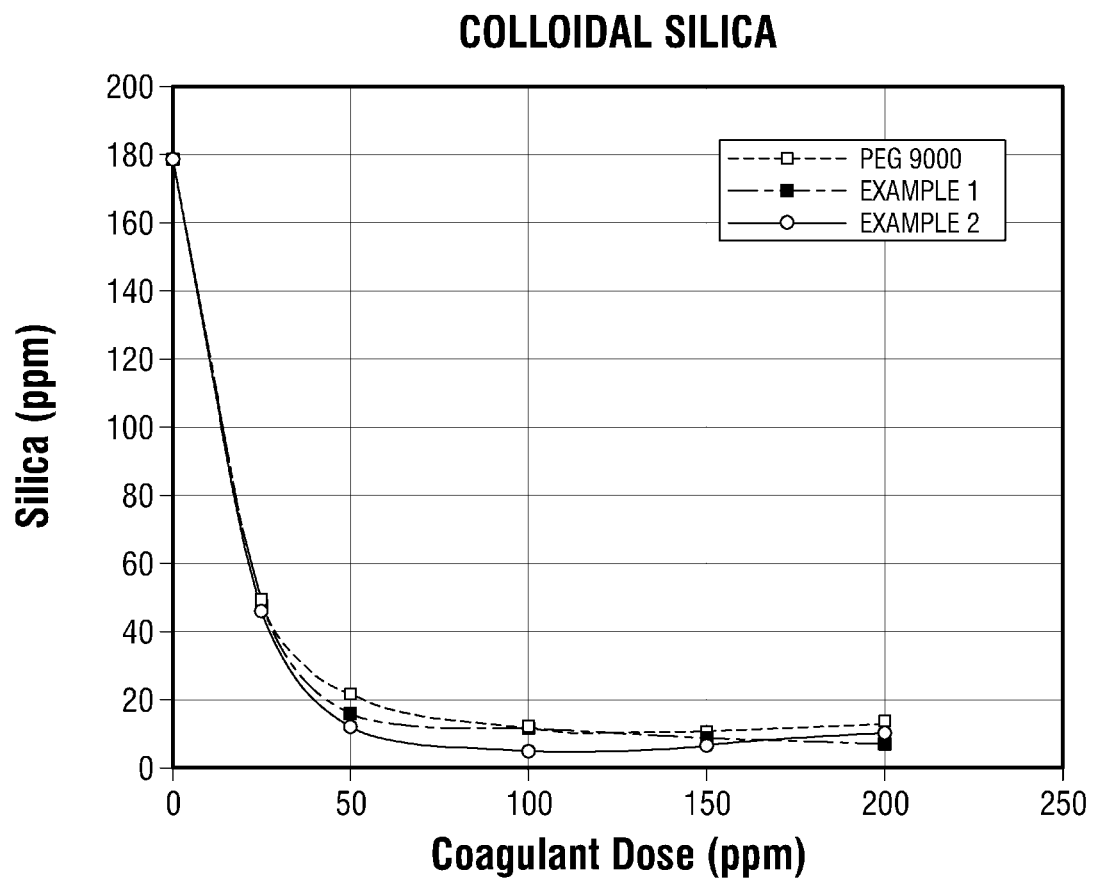
FIG. 5 shows colloidal silica results by dosage, in a separate test than that of FIG. 4, of two silica coagulants according to embodiments of the present disclosure (Example 1 and Example 2) in comparison to PEG 9000.

An embodiment of the present disclosure, "Example 2", was prepared according to the following process and tested for its solubility (active content). Example 2 was also tested for Colloidal Silica reduction with PEG 9000 and Example 1 as shown in FIG. 5.

Glycerine (192.6 g) and an aqueous KOH catalyst were charged into the 2 L reactor then two evacuation and purges were applied then heated up to 135° C. for dehydration before start of ethoxylation with a water target of less than 0.15%. Ethylene oxide was added at 145° C. until the ethylene oxide addition was at 600-800 molecular weight. Additional ethylene oxide was then continued to add to next target molecular weight stop which was at about 3000 molecular weight. Additional ethylene oxide was then continued to add to next target molecular weight stop which was at around 10,000 molecular weight. The resulting sample is glycerine plus approximately 235 moles of EO and had a molecular weight of 10,461. Example 2 is a silica coagulant of formula (I) where each of $R_1$, $R_2$ and $R_3$ is independently —O(AO)$_n$H where the (AO) group is an EO block and the value of n, on average, is 78.6 for each of $R_1$, $R_2$ and $R_3$.

The active content of Example 2 was calculated by diluting Example 2 with water to check its maximum solubility. The active content of Example 2 was fully soluble at 54.55% w/w in water, rather PEG-9000 is only able to reach an active content of around 52% w/w in water. Therefore, some embodiments of the present disclosure allow for silica coagulants with greater solubility and therefore better handling, transportation and storage characteristics.

A dose response test for colloidal silica reduction was conducted on Example 1, Example 2 and PEG 9000 with a jar test apparatus using the procedure described above, but a different hydrometallurgical processing stream sample was used from that used above in Example 1. FIG. 5 demonstrates that Examples 1 and 2 perform comparably, if not better, than PEG 9000, as evidenced in the decreasing Colloidal Silica reduction with increasing coagulant dosage.

Other embodiments and uses embodying the principles of the invention will be apparent to those having ordinary skill in the art upon consideration of the specification and figures herein. The specification and specific examples given should be considered exemplary only, and it is contemplated that the appended claims will cover any other such embodiments or modifications that fall within the scope of the invention disclosed herein.

The invention claimed is:

1. A silica agglomeration composition comprising:
   (a) a silica coagulant comprising a reaction product of glycerine and alkylene oxide,
   wherein the silica coagulant has a molecular weight above 7,000, and
   (b) water,
   wherein the silica agglomeration composition comprises the silica coagulant dissolved in the water at a weight ratio of silica coagulant to water of about 54% or higher.

2. The composition of claim 1, wherein
   (a) the silica coagulant is a compound of formula (I):

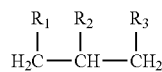

wherein each of $R_1$, $R_2$ and $R_3$ is independently —O(AO)$_n$H,
   wherein each AO group is, independently, an alkyleneoxy group selected from ethyleneoxy ("EO"), propyleneoxy ("PO"), butyleneoxy ("BO"), and combinations thereof,
   wherein each n is independently 52 to 150.

3. The composition of claim 2, wherein each (AO)$_n$ is selected from a block EO/PO mixture, a block EO/BO mixture, a block PO/BO mixture, a block EO/PO/BO mixture, a random EO/PO mixture, a random EO/BO mixture, a random PO/BO mixture, a random EO/PO/BO mixture, and combinations thereof.

4. The composition of claim 1, wherein
(a) the silica coagulant is a compound of formula (I):

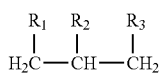

wherein each of $R_1$, $R_2$ and $R_3$ is independently —O(AO)$_n$(EO)$_p$H, wherein each AO group is, independently, an alkyleneoxy group selected from ethyleneoxy ("EO"), propyleneoxy ("PO"), butyleneoxy ("BO"), and combinations thereof,
wherein each p is independently 1 to 150 and n+p is 52 to 150.

5. The composition of claim 4, wherein (AO)$_n$ is a random EO/PO mixture with a ratio of EO:PO of 3:1.

6. The composition of claim 2, wherein each n is independently 60 to 80.

7. The composition of claim 1, wherein the silica coagulant has a molecular weight from about 8,000 to about 12,000.

8. The composition of claim 1, wherein the silica coagulant has a molecular weight from about 8,000 to about 11,000.

9. The composition of claim 1, wherein the silica coagulant is dissolved in the water at a weight ratio of silica coagulant to water of about 57% or higher.

10. The composition of claim 1, wherein the silica coagulant is dissolved in the water at a weight ratio of silica coagulant to water of about 60% or higher.

11. The composition of claim 1, wherein the silica coagulant is dissolved in the water at a weight ratio of silica coagulant to water at a range of from about 54% to about 70%.

12. A method for agglomerating silica particles in an aqueous mineral process stream comprising the steps of:
providing a silica coagulant of formula (I):

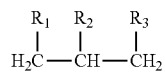

wherein each of $R_1$, $R_2$ and $R_3$ is independently —O(AO)$_n$H,
wherein each AO group is, independently, an alkyleneoxy group selected from ethyleneoxy ("EO"), propyleneoxy ("PO"), butyleneoxy ("BO"), and combinations thereof,
wherein each n is independently 52 to 150,
wherein the silica coagulant has a molecular weight above 7,000,
wherein the silica coagulant is soluble in water at a weight ratio of silica coagulant to water of about 54% or higher,
contacting the silica coagulant and the silica particles in the aqueous mineral process stream to form agglomerated silica particles.

13. The method of claim 12, further comprising contacting at least one flocculant agent to the agglomerated silica particles.

14. The method of claim 13, wherein the at least one flocculant agent is selected from the group consisting of: a particulate material, a polymeric flocculant, and combinations thereof.

15. The method of claim 12, further comprising the step of removing the agglomerated silica particles from the aqueous mineral process stream.

16. The method of claim 15, wherein the removing the agglomerated silica particles is selected from the group consisting of: filtering, settling, flocculating, and combinations thereof.

* * * * *